(12) United States Patent
Saitou

(10) Patent No.: US 10,635,084 B2
(45) Date of Patent: Apr. 28, 2020

(54) NUMERICAL CONTROL SYSTEM COORDINATING WITH TOOL CATALOG DATABASE

(71) Applicant: FANUC CORPORATION, Minamitsuru-gun, Yamanashi (JP)

(72) Inventor: Takuya Saitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 140 days.

(21) Appl. No.: 15/352,008

(22) Filed: Nov. 15, 2016

(65) Prior Publication Data

US 2017/0139403 A1 May 18, 2017

(30) Foreign Application Priority Data

Nov. 18, 2015 (JP) ................................. 2015-225512

(51) Int. Cl.
*G05B 19/4093* (2006.01)
*G05B 19/406* (2006.01)

(52) U.S. Cl.
CPC ..... *G05B 19/40938* (2013.01); *G05B 19/406* (2013.01); *G05B 2219/32422* (2013.01); *G05B 2219/36086* (2013.01); *G05B 2219/50143* (2013.01); *Y02P 90/265* (2015.11)

(58) Field of Classification Search
CPC .... G05B 19/40938; G05B 2219/32422; G05B 2219/36086
USPC ........................................................ 700/160
See application file for complete search history.

(56) References Cited

U.S. PATENT DOCUMENTS

| 5,216,617 A * | 6/1993 | Kamiguchi ........... B29C 45/766 425/135 |
| 5,831,407 A | 11/1998 | Ouchi et al. |
| 2011/0046766 A1* | 2/2011 | Mienhardt ......... G05B 19/4083 700/103 |
| 2013/0123952 A1* | 5/2013 | Reid .................... G05B 19/054 700/83 |
| 2013/0184839 A1* | 7/2013 | Bauer .................. G05B 19/409 700/83 |

FOREIGN PATENT DOCUMENTS

| JP | 07295619 A | * 11/1995 | ......... G05B 19/4068 |
| JP | H07295619 A | 11/1995 | |
| JP | H08252746 A | 10/1996 | |
| JP | 2002-196809 A | 7/2002 | |
| JP | 2002196809 A | * 7/2002 | |

(Continued)

OTHER PUBLICATIONS

Japanese Notification of Reasons for Refusal with English language translation for Application No. 2015-225512, dated Jul. 5, 2017, 8 pages.

Primary Examiner — Emilio J Saavedra
(74) Attorney, Agent, or Firm — RatnerPrestia

(57) ABSTRACT

In a numerical control system including a numerical controller having a tool database and a tool catalog database which can be referred to from the numerical controller, the tool catalog database has tool catalog data including first cutting condition data, and the tool database has tool data including second cutting condition data to be used for machining. After execution of the machining, the numerical controller updates the first cutting condition data to be stored in the tool catalog database based on the second cutting condition data stored in the tool database.

5 Claims, 6 Drawing Sheets

(56) References Cited

FOREIGN PATENT DOCUMENTS

| JP | 2004261902 A | * | 9/2004 |
|----|--------------|---|--------|
| JP | 2004261902 A |   | 9/2004 |
| JP | 2010146537 A | * | 7/2010 |
| JP | 2010146537 A |   | 7/2010 |

* cited by examiner

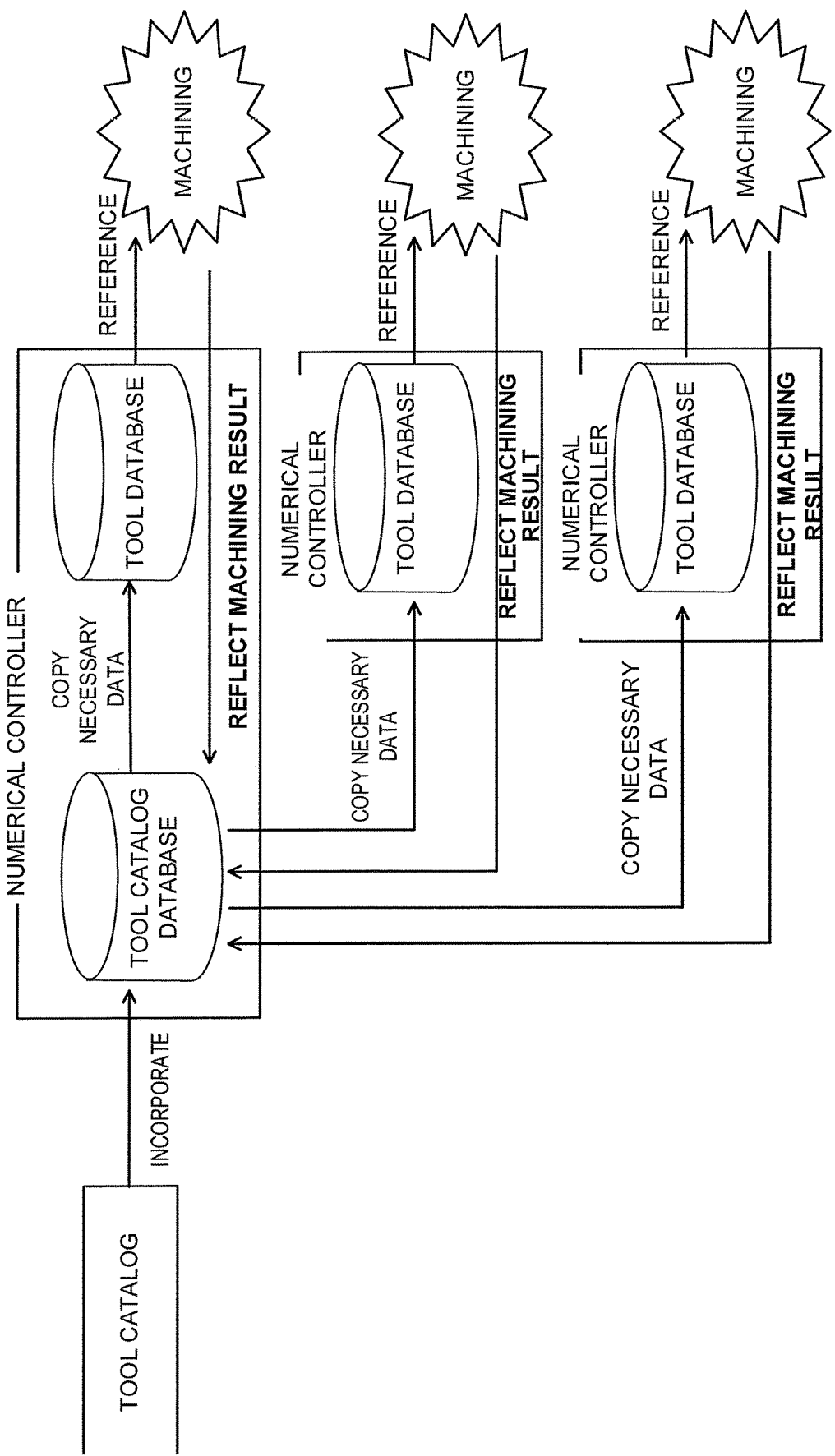

FIG.3

| No. | MODEL No. | MANUFACTURER NAME | SHAPE DATA 1 | SHAPE DATA 2 | ... | CUTTING CONDITIONS 1 | | | | ... | CUTTING CONDITIONS 2 | | | | ... |
|---|---|---|---|---|---|---|---|---|---|---|---|---|---|---|---|
| | | | | | | ALUMINUM/MACHINE A | F1 | S1 | | | ALUMINUM/MACHINE B | F2 | S2 | | |
| 1 | A-123 | COMPANY A | 40.000 | 2.000 | ... | SKD11 | 2200 | 19100 | ... | ... | SPECIAL WORKPIECE A | 2500 | 20500 | ... | ... |
| 2 | A-456 | COMPANY A | 45.000 | 0.750 | ... | | 1200 | 20000 | ... | ... | | 800 | 16000 | ... | ... |
| 3 | B-123 | COMPANY B | 40.000 | 0.500 | ... | S50C/GROOVE | 70 | 14300 | ... | ... | S50C/GROOVE | 50 | 11200 | ... | ... |
| ... | ... | ... | ... | ... | ... | ... | ... | ... | ... | ... | ... | ... | ... | ... | ... |

TOOL CATALOG DATABASE

COPY NECESSARY DATA

| No. | TOOL NAME | ATTACHMENT INFORMATION | TOOL CORRECTION INFORMATION | TOOL LIFE INFORMATION | DIMENSION DATA FOR INTERFERENCE CHECK | CATALOG No. | WORKPIECE MATERIAL | F1 | S1 | ... |
|---|---|---|---|---|---|---|---|---|---|---|
| 1 | TOOL A | ... | ... | ... | ... | 1 | ALUMINUM/MACHINE A | 2200 | 19100 | ... |
| 2 | TOOL B | ... | ... | ... | ... | 2 | SPECIAL WORKPIECE A | 800 | 16000 | ... |
| 3 | TOOL C | ... | ... | ... | ... | 3 | S200C/GROOVE | 80 | 15200 | ... |
| ... | ... | ... | ... | ... | ... | ... | ... | ... | ... | ... |

TOOL CATALOG DATABASE

COPY NECESSARY DATA

NUMERICAL CONTROL SYSTEM COORDINATING WITH TOOL CATALOG DATABASE

BACKGROUND OF THE INVENTION

Field of the Invention

The present invention relates to a numerical control system coordinating with a tool catalog database.

Description of the Related Art

When it is desired to confirm the shape of a tool, information on a dimension and information on cutting conditions during machining work using a machine tool, it is common to refer to a catalog brochure or a catalog electronic file of the tool. When the confirmed shape of the tool, information on the dimension and information on cutting conditions are used at a numerical controller, a required data value is manually input through a user interface such as a manual data input apparatus provided to the numerical controller with reference to the catalog.

As an example of prior art which deals with data relating to the tool as described above, Japanese Patent Application Laid-Open No. 2002-196809 discloses a technique of determining whether tool information is appropriate by comparing the information read out from a tool manufacturer database in which manufacturer information such as recommended machining conditions of each tool is recorded, with the tool information of a user.

Because the tool catalog is provided for each tool manufacturer or, in some cases, for each type of tool, when machining work is performed, it is necessary to prepare and bring tool catalogs respectively corresponding to a plurality of tools to be used at the machine tool to a job site, which becomes a burden for an operator. Further, there is no means for directly passing data described in the tool catalog to the numerical controller, the operator has to input the shape of the tool, the information on the dimension and the information on cutting conditions to the numerical controller while referring to the tool catalogs every time the operator controls the machine tool with the numerical controller to perform machining, which also becomes a heavy burden for the operator.

Further, because the cutting conditions described in the tool catalog are merely an example, and the cutting conditions are not necessarily optimal conditions according to a configuration of machine to be actually used for machining, the type of workpiece (material to be cut), the operator sets the cutting conditions through experiment and trial and error while referring to the cutting conditions described in the tool catalog upon actual machining. However, even if optimal cutting conditions can be obtained as a result of machining being actually executed under the cutting conditions set in this manner, because there is no means for incorporating the obtained cutting conditions into the catalog again, there is a problem that it is impossible to share know-how among workers.

SUMMARY OF THE INVENTION

Therefore, the present invention provides a numerical control system which makes it possible to facilitate usage of cutting conditions included in a tool catalog and sharing of machining know-how obtained through actual machining among workers.

In the present invention, a tool catalog database in which data (catalog value) such as a dimension of a tool, shape data and cutting condition data, is defined for each tool is aggregated is prepared within a numerical controller. The data stored in the tool catalog database can be used when a value is referred to on the numerical controller or when machining operation is performed. The data in the tool catalog database can be set by incorporating a tool data file provided from a tool manufacturer, and also can be updated through manual input. When cutting conditions different from the cutting conditions in the tool catalog database are used upon actual machining, and the cutting conditions are optimal cutting conditions, the cutting condition data in the tool catalog database is updated. It is also possible to refer to the data from another numerical controller on a network or a tool catalog database of a host PC.

A first aspect of the numerical control system according to the present invention includes a numerical controller having a tool database in which data of a tool to be used for machining is stored, and a tool catalog database which is shared among a plurality of machines and which can be referred to from the numerical controller. The tool catalog database has at least one piece of tool catalog data including first cutting condition data. The tool database has at least one piece of tool data including second cutting condition data to be used for the machining. Then, after execution of the machining, the first cutting condition data to be stored in the tool catalog database is updated based on the second cutting condition data which is stored in the tool database and which is to be used for the machining.

A second aspect of the numerical control system according to the present invention includes a numerical controller having a tool database in which data of a tool to be used for machining is stored and a machining program, and a tool catalog database which is shared among a plurality of machines and which can be referred to from the numerical controller. The tool catalog database has at least one piece of tool catalog data including first cutting condition data. The tool database has at least one piece of tool data including second cutting condition data. The machining program has third cutting condition data to be used for the machining. Then, after execution of the machining, the first cutting condition data to be stored in the tool catalog database is updated by the third cutting condition data and data not included in the third cutting condition data among the second cutting condition data.

The tool catalog database may be created based on a tool data file provided from a tool manufacturer or may be created through manual input by an operator.

The tool catalog database may be located within the numerical controller in which the tool database is located or may be located on another numerical controller or an upper host system connected through a network.

According to the present invention, it is possible to confirm a dimension of a tool, information on a shape and information on cutting conditions without bringing a catalog to a machining job site. Further, it is possible to use the above-described information for machining operation of the numerical controller without manually inputting the above-described information. Still further, it is possible to accumulate optimal cutting conditions (machining know-how) based on a machining environment in a database and share the information among a plurality of apparatuses.

BRIEF DESCRIPTION OF THE DRAWINGS

The forgoing and other objects and feature of the invention will be apparent from the following description of preferred embodiments of the invention with reference to the accompanying drawings, in which:

FIG. 2 is a diagram illustrating outline of reference and update of a tool catalog database in the numerical control system illustrated in FIG. 1;

FIG. 3 is a diagram explaining an example where data is copied from the tool catalog database to a tool database in the numerical control system illustrated in FIG. 1 when machining is started;

DETAILED DESCRIPTION OF THE PREFERRED EMBODIMENTS

Figure 1:
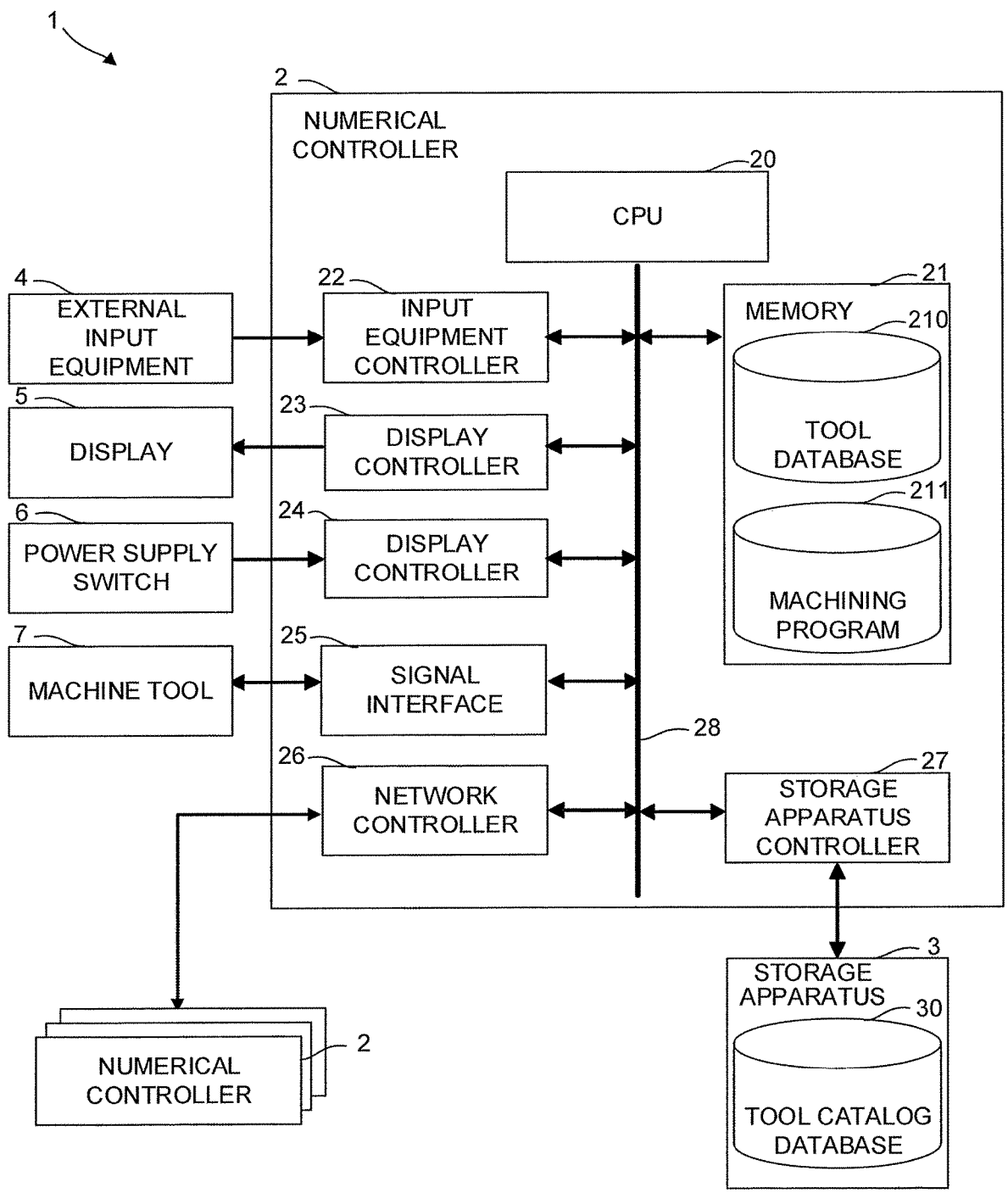
FIG. 1 is a schematic block diagram of a numerical control system according to an embodiment of the present invention.

Outline of a numerical control system according to an embodiment of the present invention will be described using FIG. 1.

A numerical control system 1 includes a plurality of numerical controllers 2, and a storage apparatus 3 connected to one of the plurality of control apparatuses, and a tool catalog database 30 is stored in the storage apparatus 3.

The numerical controller 2 includes a CPU 20 configured to control the whole of the numerical controller 2, a memory 21 such as a RAM and a ROM connected to the CPU 20 through a bus 28, an input equipment controller 22 configured to control external input equipment 4, a display controller 23 configured to control a display 5, a power supply controller 24 configured to control on/off of a power supply of the numerical controller 2 using an on/off signal from a power supply switch 6, a signal interface 25 configured to perform input and output of signals with a machine tool 7 to control the machine tool 7, a network controller 26 configured to control transmission and reception of data with another numerical controller 2, a host computer which is not illustrated, or the like, and a storage apparatus controller 27 configured to control the storage apparatus 3.

In the memory 21, a tool database 210 in which information relating to a tool to be used for machining by the machine tool 7 is stored, and a machining program 211 used for the machining, are stored. The tool database 210 and the machining program 211 are updated through input from the external input equipment 4 or the external storage apparatus 3. In this storage apparatus 3, a tool catalog database 30 is stored based on a tool catalog issued by a tool manufacturer.

In the tool catalog database 30, an identification number (catalog number), a model number, a manufacturer name, shape data including dimension data of each tool used for machining, and, further, cutting conditions for each material of the workpiece to be machined using the tool are stored. The cutting conditions for each workpiece material stored in the tool catalog database 30 include a feed rate F, spindle speed S, or the like.

In the tool database 210, an identification number for identifying each cutting conditions to be applied upon machining, a tool to be used on the cutting conditions, attachment information for attaching the tool to the machine tool 7, information on tool correction relating to the tool, information on tool life, tool shape information including dimension data of a tool to be used for interference check, and cutting conditions to be used upon machining, including a material of the workpiece, a feed rate, spindle speed, or the like, are stored.

Outline of reference and update of the tool catalog database 30 in the numerical control system 1 illustrated in FIG. 1 will be described using FIG. 2.

The tool catalog database 30 is created by, for example, incorporating by an operator a tool data file provided from a tool manufacturer as a tool catalog. As an example, this tool data file is provided in a form of media such as a CD-ROM and a CF file or provided as a file which can be downloaded through a network. When the tool data file is provided in the form of media, the tool data file is incorporated using a media reading apparatus which is external input equipment 4 under control of the input equipment controller 22. Meanwhile, when the tool data file is provided as a file which can be downloaded, the tool data file is incorporated from an external host computer, or the like, under control of the network controller 26. Further, while there is a case where the tool catalog is provided in the form of brochure, or the like, from the tool manufacturer, in such a case, the tool catalog database 30 may be created by the operator performing manual input using an input apparatus which is the external input equipment 4.

Prior to start of machining using the machine tool 7 by controlling the numerical controller, an operator registers data relating to each tool attached to the machine tool 7 in the tool database 210 of the numerical controller 2. When the operator registers the data of the tool in the tool database 210, the operator reads out the data of the tool (such as tool shape data including a tool dimension, cutting conditions including a feed rate F, spindle speed S corresponding to a material of the workpiece to be machined, or the like) from the tool catalog database 30 with reference to the tool catalog database 30 and copies necessary data among the data to the tool database 210.

During machining using the machine tool 7, the operator can use the cutting conditions copied from the tool catalog database 30 to the tool database 210 without any change or can also change part or all of the cutting conditions stored in the tool database 210 depending on an environment of machining or experience and use the changed cutting conditions.

Further, the operator can also perform machining while directly designating the cutting conditions using a machining program. In such a case, the numerical controller 2 detects that the cutting conditions copied from the tool catalog database 30 are different from the cutting conditions actually used in machining and notifies the operator that the cutting conditions are different after the machining is completed. The operator determines whether or not to update the tool catalog database 30 in response to the notification. When the operator determines that the tool catalog database 30 should be updated, the numerical controller 2 extracts the cutting conditions actually used in the machining from the tool database 210 or the machining program and updates the tool catalog database 30 using the extracted cutting conditions.

When the tool catalog database 30 is stored in the storage apparatus 3 connected to the numerical controller 2, the tool catalog database 30 is referred to and updated under control of the storage apparatus controller 27. Further, when the storage apparatus 3 in which the tool catalog database 30 is stored is connected to a numerical controller 2 different from the numerical controller 2 operated by the operator, the tool catalog database 30 is referred to and updated by communicating with the different numerical controller through a network under control of the network controller 26.

An example where data is copied from the tool catalog database 30 to the tool database 210 when machining is started will be described with reference to FIG. 3.

For example, when machining is performed using the machine tool 7 including tools A, B and C, the operator operates the numerical controller 2 to refer to data of tools corresponding to the tools A, B and C from the tool catalog database 30. Then, the operator copies shape data including tool dimension data of each of the tools A, B and C stored in the tool catalog database 30 as dimension data for interference check of each of the tools A, B and C of the tool database 210.

Further, if the machine tool 7 to be controlled is machine A, and a material of the workpiece to be machined by a tool A of the machine A is aluminum, then cutting conditions (such as a feed rate F1 and spindle speed S1) corresponding to "aluminum/machine A", among the cutting conditions of the tool A stored in the tool catalog database 30, are copied as the cutting conditions of the tool A of the tool database 210. It should be noted that when data is copied from the tool catalog database 30, an identification number (catalog number) of the copied catalog and reference conditions of the copied cutting conditions (for example, cutting conditions 1, cutting conditions 2) may be recorded in the tool database 210 so that data to be updated can be easily recognized when the tool catalog database 30 is updated later.

An example where, when a result of machining is favorable, cutting conditions of each tool used for machining are extracted from the tool database 210 or the machining program and reflected to the tool catalog database 30 will be described using FIG. 4.

Figure 4:
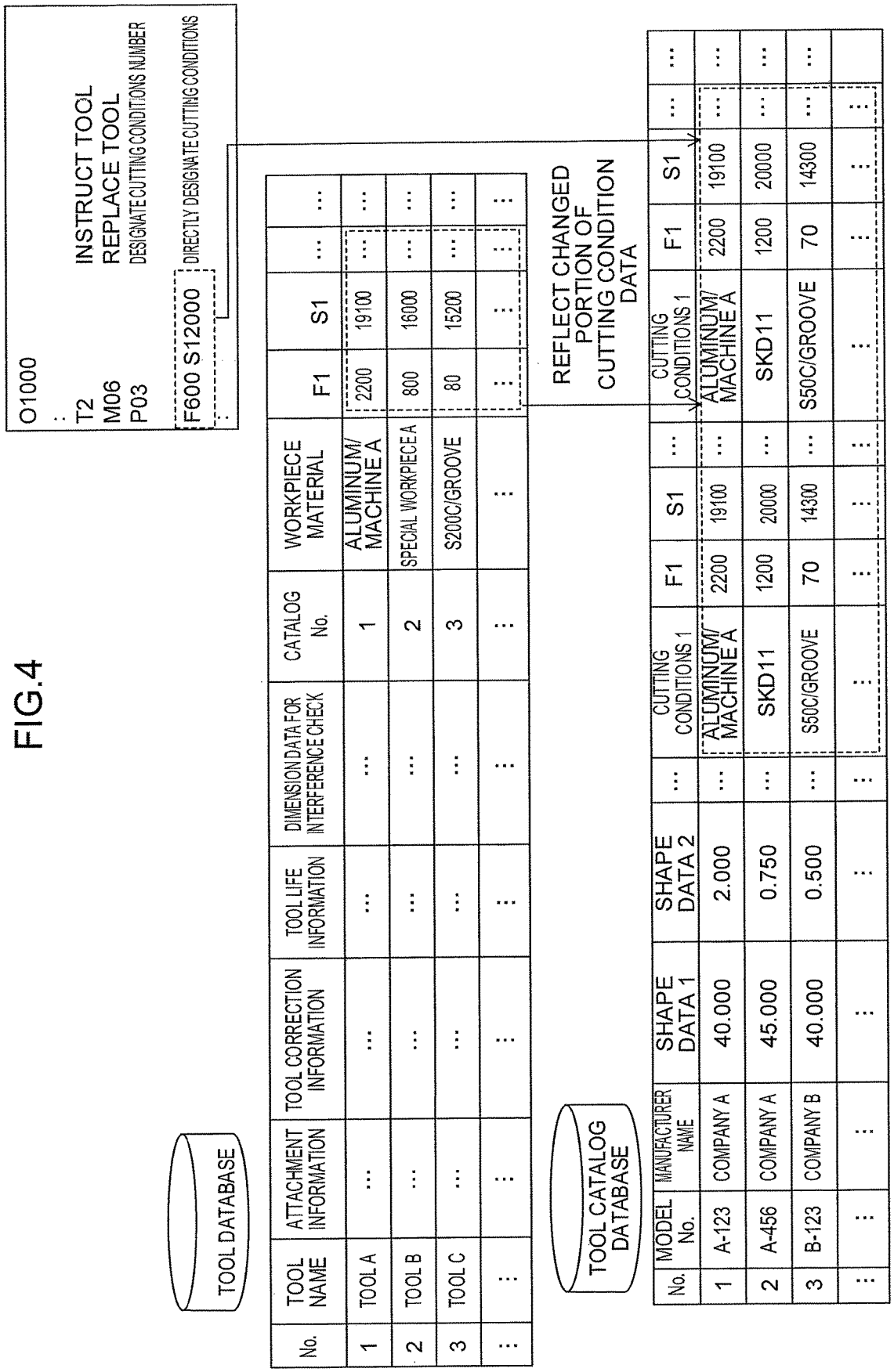
FIG. 4 is a diagram illustrating an example where cutting conditions of each tool used for machining are reflected to the tool catalog database in the numerical control system illustrated in FIG. 1 when the machining is finished.

According to the example in FIG. 4, concerning the tool A and the tool C, the cutting conditions stored in the tool database 210 are incorporated into the tool catalog database 30. On the other hand, concerning the tool B, because the cutting conditions are directly designated within the machining program, the cutting conditions designated within the machining program are incorporated into the tool catalog database 30 in priority to the cutting conditions stored in the tool database 210.

Figure 5:
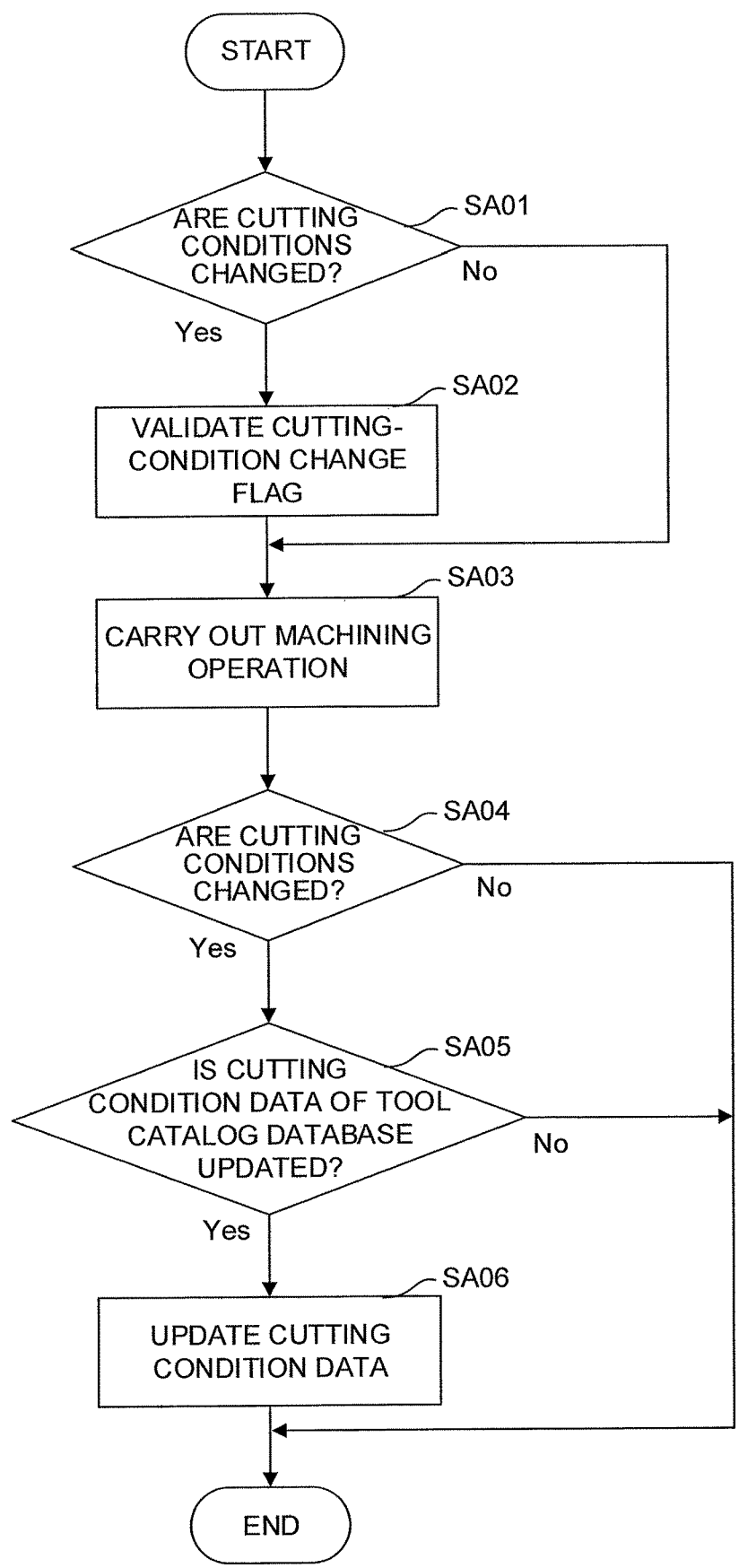
FIG. 5 is a flowchart illustrating flow of machining executed on the numerical control system in FIG. 1.

An example of update processing of the tool catalog database 30 executed on the numerical controller 2 according to the present embodiment will be described using the flowchart in FIG. 5.

[Step SA01] The numerical controller 2 determines whether or not the cutting conditions to be used for machining are changed (whether or not the cutting conditions in the tool database 210 are changed or different cutting conditions are designated by the machining program). When the cutting conditions are changed, the machining proceeds to step SA02, otherwise, the processing proceeds to step SA03.

[Step SA02] The numerical controller 2 validates a cutting-condition change flag.

[Step SA03] The numerical controller 2 controls the machine tool 7 to carry out machining operation.

[Step SA04] The numerical controller 2 determines whether or not the cutting-condition change flag is valid, and when the flag is valid, the processing proceeds to step SA05, and, when the flag is not valid, the processing is finished.

[Step SA05] The numerical controller 2 urges the operator to give an instruction whether or not to update the tool catalog database 30. In response to this, when the operator gives an instruction to update the tool catalog database 30, the processing proceeds to step SA06, and, when the operator gives an instruction not to update the tool catalog database 30, the processing is finished.

[Step SA06] The numerical controller 2 updates the tool catalog database 30 using the cutting conditions used in the machining.

While the embodiment of the present invention has been described above, the present invention is not limited to the above-described example of the embodiment and can be implemented in various aspects by applying modifications as appropriate.

Figure 6:
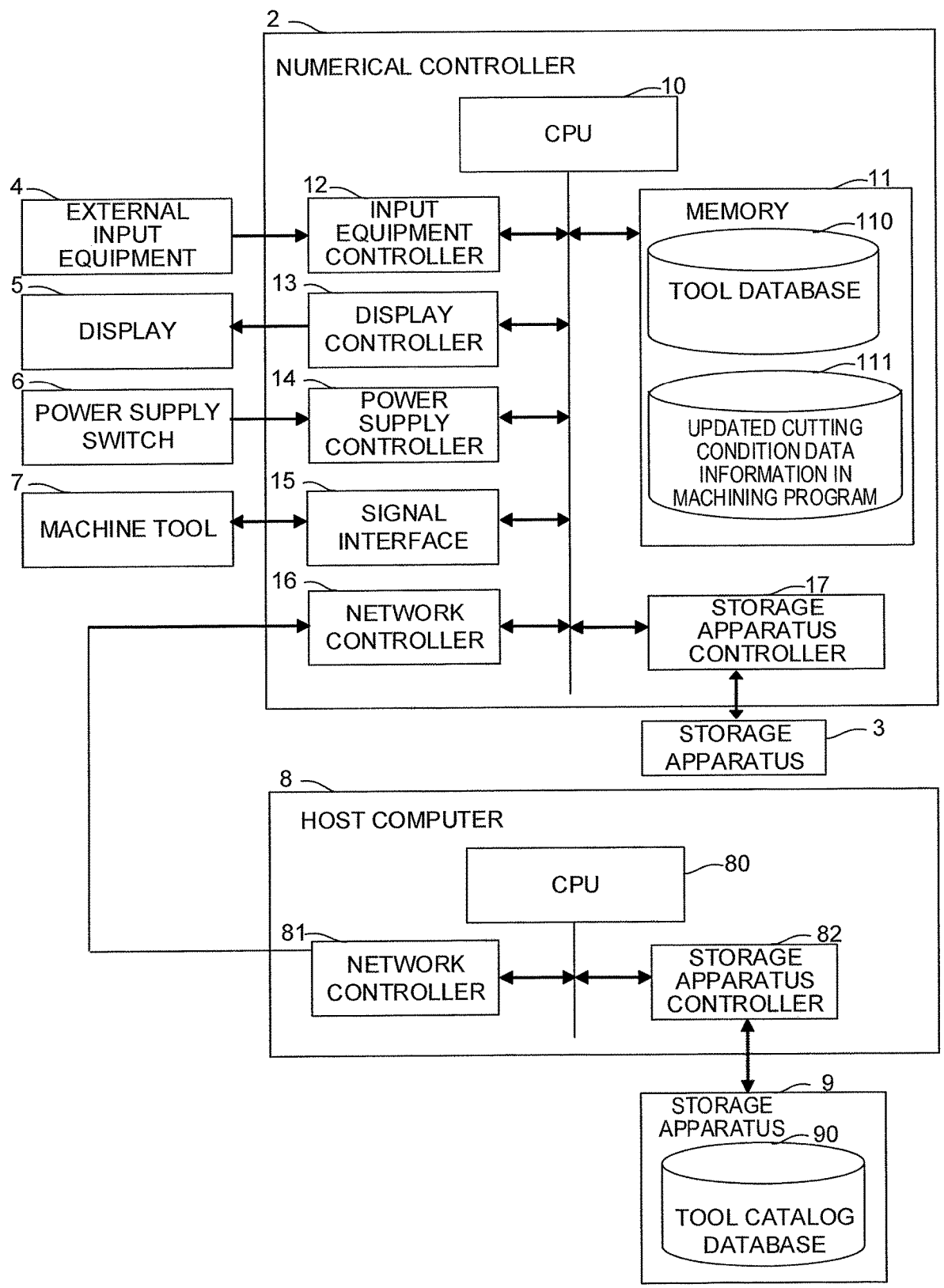
FIG. 6 is a schematic block diagram of a numerical control system according to another embodiment of the present invention.

For example, while in the above-described embodiment, a case where the tool catalog database 30 is stored in the storage apparatus 3 connected to the numerical controller 2 has been described, as illustrated in FIG. 6, it is also possible to employ a configuration where a tool catalog database 90 is stored in a storage apparatus 9 connected to a host computer 8 disposed on a management system (upper host system) in the numerical control system, and a plurality of numerical controllers 2 share the tool catalog database 90 through a network. According to this configuration, it is possible to easily manage the tool catalog database 90 on the management system.

The invention claimed is:
1. A numerical control system comprising:
  a numerical controller having a tool database in which data of a tool to be used for machining is stored; and
  a tool catalog database which is accessible among a plurality of machines and which is accessible by the numerical controller,
wherein the numerical controller is configured to:
  retrieve from the tool catalog database, at least one piece of tool catalog data including first cutting condition data;
  receive a modified first cutting condition data input from an operator into the tool database and receive first modified cutting condition data from a machining program;
  prioritizing extraction of the modified first condition data from the machining program, and extracting the modified first condition data from the machining program;
  control a machine to execute a machining based on the machining program and the modified first cutting condition data of the machining program, the modified first cutting condition data used for the machining;
  after execution of the machining, receive an instruction from the operator approving or denying an update to the tool catalogue database based on the modified first cutting condition data of the machine program, and
  in response to the instruction from the operator approving an update, update the first cutting condition data stored in the tool catalog database with the modified first cutting condition data of the machining program used for the machining, or update the first cutting condition data stored in the tool catalog database with the modified first cutting condition data of the machining program used for the machining and with modified cutting condition data in the tool database that is not included in the modified first cutting condition data of the machining program,
  wherein the updated first cutting condition data in the tool catalogue database is accessible by the plurality of machines.
2. The numerical control system according to claim 1, wherein the tool catalog database is created based on a tool data file provided from a tool manufacturer.

3. The numerical control system according to claim 1, wherein the tool catalog database is created through manual input by the operator.

4. The numerical control system according to claim 1, wherein the tool catalog database is located within the numerical controller in which the tool database is located.

5. The numerical control system according to claim 1, wherein the tool catalog database is located on a different numerical controller or an upper host system connected through a network.

* * * * *